J. G. CASTERAN.
TRACTOR.
APPLICATION FILED JULY 16, 1913.
1,138,453.
Patented May 4, 1915.
4 SHEETS—SHEET 3.
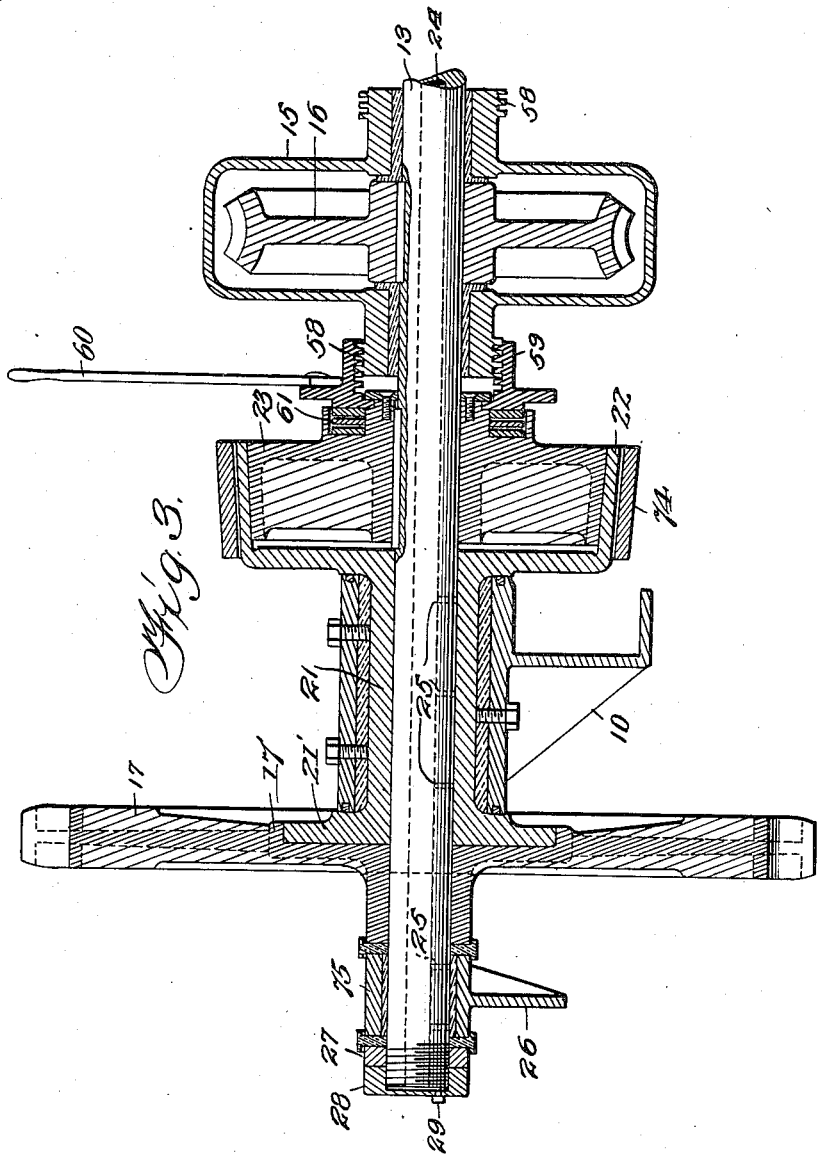
Inventor
Juan G. Casteran.

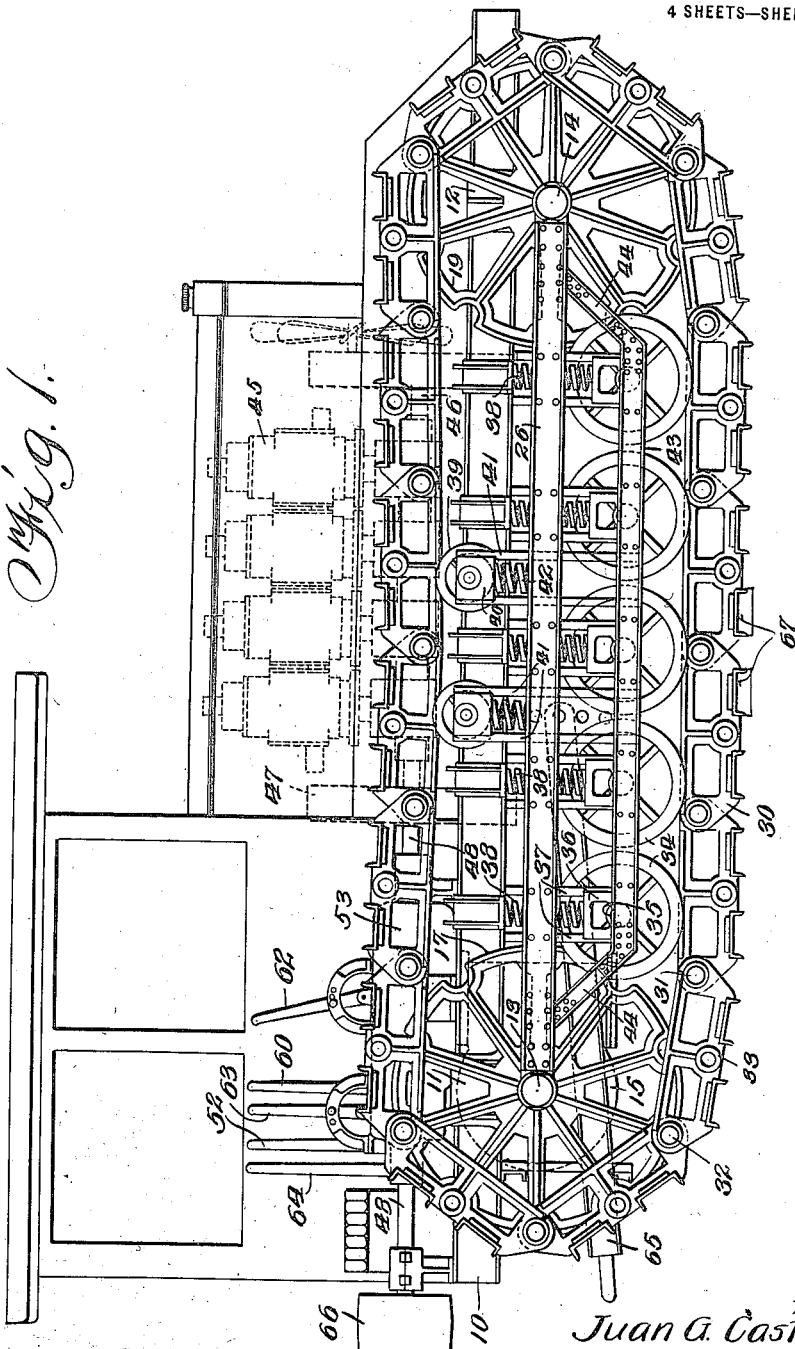

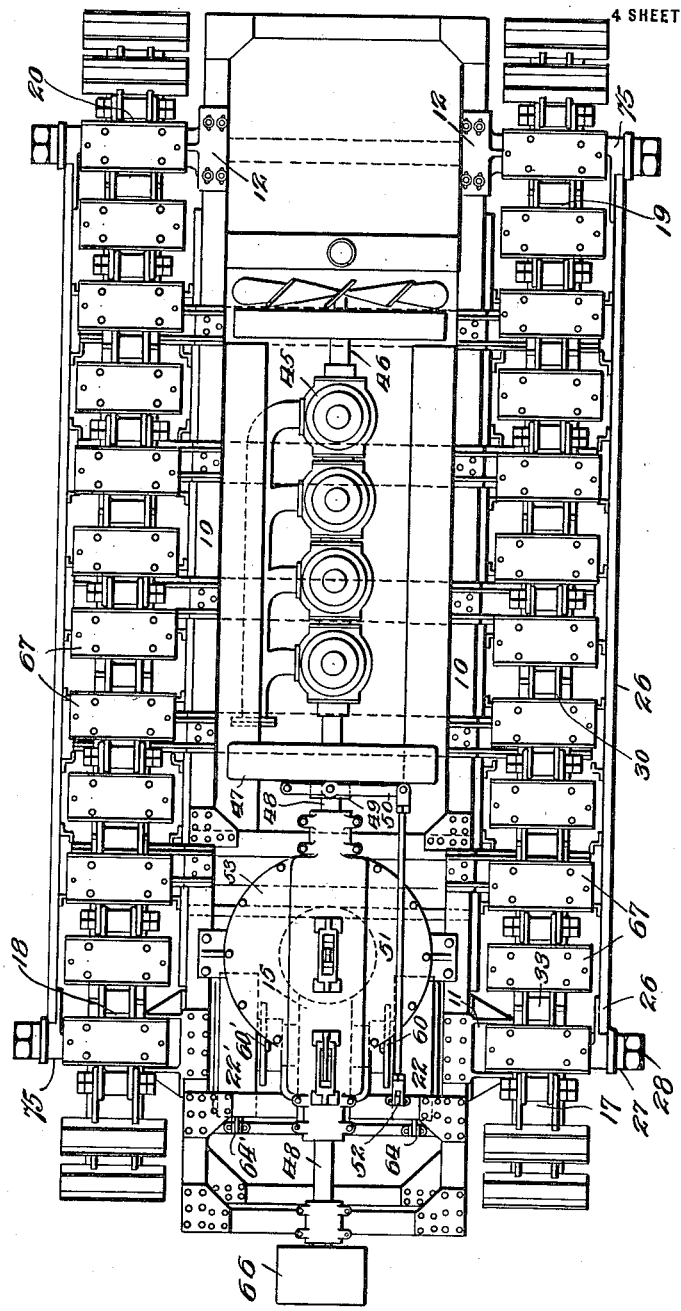

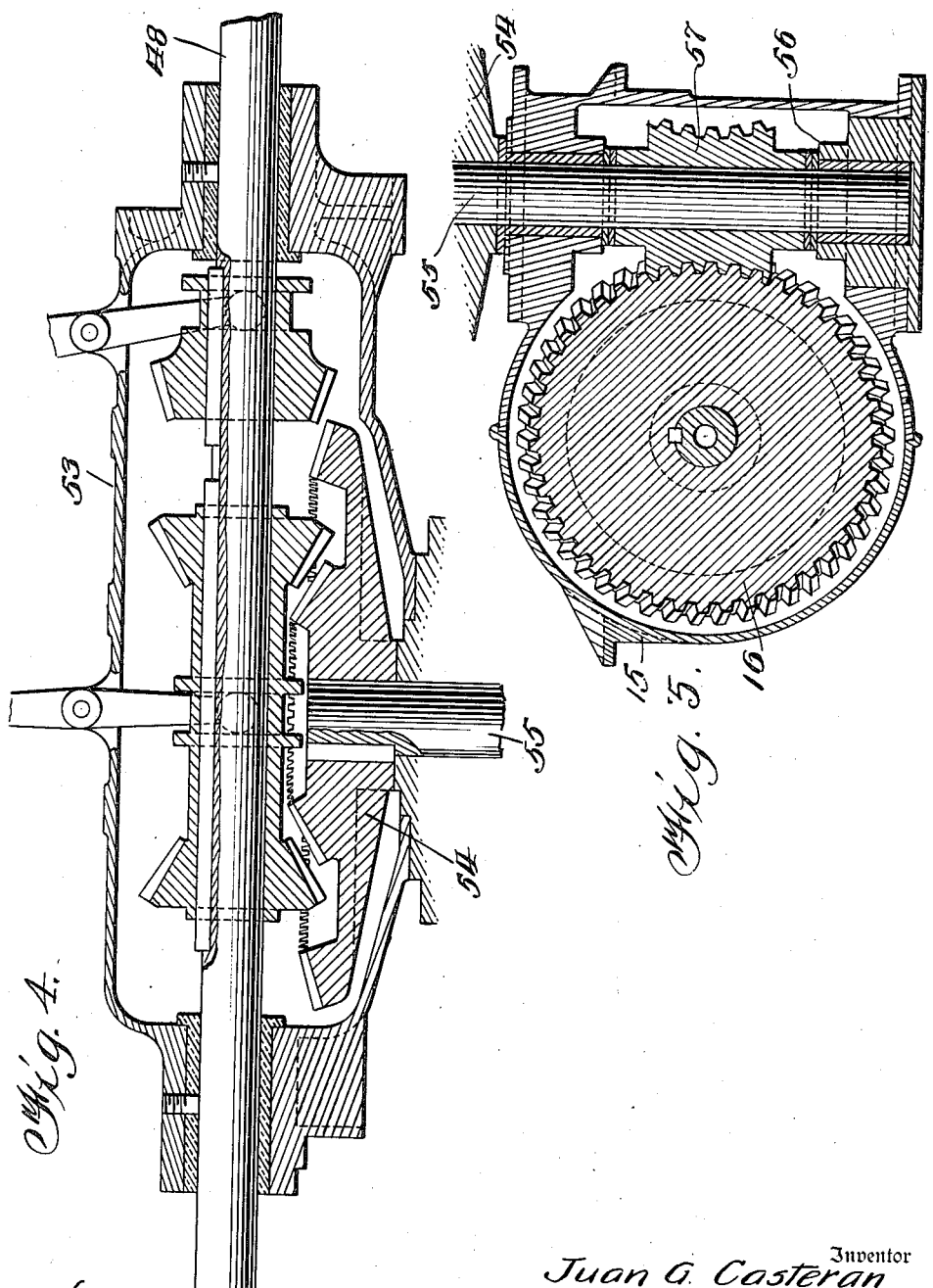

UNITED STATES PATENT OFFICE.

JUAN G. CASTERAN, OF BUENOS AIRES, ARGENTINA.

TRACTOR.

1,138,453. Specification of Letters Patent. Patented May 4, 1915.

Application filed July 16, 1913. Serial No. 779,361.

*To all whom it may concern:*

Be it known that I, JUAN G. CASTERAN, a citizen of Argentina, residing at Buenos Aires, Argentina, have invented certain new and useful Improvements in Tractors; and I do hereby declare the following to be a full, clear, and exact description of the invention, such as will enable others skilled in the art to which it appertains to make and use the same.

This invention relates to tractors, and has for an object to provide a new and improved structure for supporting the operating and traction wheels upon a movable track.

In the drawings, Figure 1 is a view of the tractor in side elevation, certain parts of the housing being broken away to show the mechanism, Fig. 2 is a top plan view of the structure with the housing removed, Fig. 3 is a diametrical sectional view through one of the sprockets, Fig. 4 is a diametrical sectional view through the transmission housing and Fig. 5 is a sectional view of the transmission gear with the housing broken away.

Like characters of reference indicate the corresponding parts throughout the views.

The improved structure which forms the subject matter of this application comprises the main rigid frame 10 having bearings 11 and 12 rigidly mounted thereon in which bearings are respectively journaled the shafts 13 and 14. The bearing 11 is constructed as a housing such housing being indicated in Figs. 1 and 6 at 15 which said housing is located centrally between the side bars of the rigid frame 10 and contains the worm gear 16 seen at Figs. 3 and 5.

Upon the shaft 13 are mounted sprockets 17 and 18 and upon the shaft 14 are mounted the sprockets 19 and 20. The several sprockets 17, 18, 19 and 20 are loosely mounted on the shafts 13 and 14, the sprockets 17 and 18 having cupped hubs 17' of polygonal or irregular internal outline. These hubs are removably engaged by heads 21' of corresponding outline which are formed at the outer end of sleeves 21 as shown in Fig. 3. Said sleeves are provided at their inner ends with clutch cups 22 into which clutch members 23 are adapted to be forced by mechanism to be hereinafter more fully described. The shafts 13 and 14 are hollow as indicated at 24 in Fig. 3 and lubricating passages 25 are provided for lubricating the sleeves of the sprockets. Intermediate their ends the sleeves 21 are journaled in bearings carried by the rigid frame 10 as shown at Fig. 3 while the outer ends of the shafts 13 and 14 are supported in bearings 75 on the outer frame members 26. The outer ends of the shaft 13 are held in place in said bearings 75 by means of nuts 27 and have caps 28 serving as lock-nuts for the nuts 27 each cap having a hole closed by a screw 29 permitting the filling of the bore of the shaft 13 with oil or other lubricant. With this construction any sprocket wheel may be removed by first removing the cap 28 and nut 27 and then the side bar or outer frame 26, after which the sprocket wheel can be slipped off the shaft and its hub 17' will disconnect from the head 21'. This leaves the shaft and sleeves in place in the main frame bearings, and does not require the taking down of the entire machine or its prime mover.

About the sprockets 17 to 20 inclusive articulated tracks are employed as indicated at 30 the specific construction of such articulated track forming the subject matter of a copending application No. 768,390 filed May 17, 1913; and it is therefore not described in detail herein. It will be noted that each of the links of such track is provided with three bearing members comprising the pintles 31 and 32 at the ends of the links and an intermediate bearing member 33. By reference to Fig. 1, it will be seen that the three bearing members are engaged about the periphery of the sprockets and by reason of the staggered relation of the three bearing members, the sprocket is inclined to assume substantially a circular form and yet at the same time accommodate links which occupy a circumferential area of 72 degrees. By using such articulated track composed of long sections or links, a track between the two sprockets is provided having a greater degree of rigidity than would be possible with links of proportionately smaller extent. Upon the lower working run of the articulated track rest bearing wheels 34 journaled as at 35 in blocks 36 slidable vertically in guideways 37. The springs 38 are also provided which permits a limited amount of yielding movement of the bearing wheels 34 to compensate for unevenness in surface of the ground traveled upon. The upper or idle run of the track is supported upon idlers 39 which are likewise journaled in bearing blocks 40 slidable in guide-ways 41 and supported upon springs 42.

The lower ends of the guide-ways 37 are secured to the frame sections 43 which are connected with the outer frame members 26 by means of inclined braces 44 as seen particularly at Fig. 1.

Upon the rigid frame so supported upon the sprocket wheels and bearing wheels 34, the prime mover 45 is mounted having a shaft 46 rigidly connected with the fly-wheel 47 which fly-wheel serves also as one member of a clutch. A shaft 48 is journaled in alinement with the shaft 46 and a clutch member 49 mounted thereon controlled by a lever 50 which through the medium of a link 51 is controlled by a manual lever 52. It is apparent that by manipulating the manual lever 52, the clutch 49 will be slidably moved upon the shaft 48 and thrown into and out of operative engagement with the clutch carried by the fly-wheel 47. No individuality is claimed for the clutch consisting of the fly-wheel 47 and clutch 49, such members being friction clutches of the usual and ordinary type.

The shaft 48 runs through and is journaled in a housing 53 seen in detail in Fig. 4 and is provided with sliding gears not necessary to describe herein in detail. The gear 54 is carried upon the shaft 55 which extends downwardly through the bearing 56 shown at Fig. 5 and carries a worm 57 intergeared with the worm gear 16 shown at Figs. 3 and 5. It will be apparent therefore, with the clutch members 47 and 49 in engagement and the shaft 48 driven, the shaft 55 will also be driven driving the worm 57 and the worm gear 16. As shown at Fig. 3 the worm gear 16 is fast on the shaft 13 and the clutch member 23 is also rigidly connected therewith. Upon the housing 15 a screw thread 58 is formed, engaged by a threaded collar 59 such collar being moved rotatably by a lever 60 rigidly connected with the threaded collar 59. Between the collar 59 and the clutch member 23 a roller or ball bearing structure 61 is employed whereby friction between the clutch member 23 and the collar 59 is reduced. It will be apparent that a limited rotary movement of the collar 59 by reason of its threaded engagement with the housing 15 will serve to throw the clutch member 23 into engagement with the clutch member 22 which member being rigidly connected with the sprocket 17 rotates the sprocket therewith. At Fig. 3 only one of such sprockets and clutches is shown but it will be apparent that a like arrangement is provided for the sprocket 18, the lever for controlling being shown at 60' at Fig. 2.

In Fig. 1 are shown reverse, and second speed levers 62 and 63, forming a part of the co-pending application relating to a transmission apparatus and not described herein in detail.

The clutch member 22 which is rigidly connected with the sprocket 17 is provided with a suitable brake 74 controlled by a lever 64, a like lever 64' controlling another similar brake acting on the clutch for the sprocket 18. When it is desired to turn the tractor, the frame itself being rigid, one of the clutches is disengaged and the brake applied to the other clutch whereby one of the articulated tracks is advanced along the ground while the other is held against movement or retarded as occasion may make necessary or desirable.

The frame 10 is provided with a draw-bar 65 whereby the tractor may be connected with any vehicle or other device which is to be drawn. The shaft 48 is continued in the rear of the frame and provided with a pulley 66 from which power may be taken for operating any desired mechanical device when the tractor is standing stationary. By employing such shaft and pulley it will be apparent that the tractor may be employed for any apparatus where power of a portable nature is required or desired.

When the tractor is to be employed upon hard surfaces such for instance, as paved streets or the like, provision is made for preventing the cutting of the surface, such provision consists in inserting blocks 67 in each of the links of the articulated track as shown particularly at Fig. 2. The insertion of these blocks in the tread of the links of such track prevents the sharpened prongs or edges from destroying the surface of the road bed.

From the foregoing description of the several parts and from observation it is believed that the operation of the structure as an entirety will be readily and completely understood without further detail description of such operation.

Various modifications may be made within the scope of this invention without departing from the spirit thereof and the drawings are submitted for illustrative purposes only.

Having thus described my invention, I claim:

1. In a tractor, the combination with a rigid frame having bearings, sleeves mounted therein and having heads at their outer ends, a prime mover, and manually controlled connections between it and said sleeves; of an outer frame comprising side bars having bearings alined with those of the main frame, a shaft passing through said sleeves and extending through and journaled in the bearings of the outer frame, wheels having cupped hubs loose on said shaft between the last-named bearings and said heads and adapted to engage the latter, and nuts at the extremities of said shaft.

2. In a tractor, the combination with a rigid frame having bearings, sleeves mounted therein and having heads at their outer ends, a prime mover, and manually controlled connections between it and said sleeves; of an outer frame comprising side bars having bearings alined with those of the main frame, a shaft passing through said sleeves and extending through and journaled in the bearings of the outer frame, wheels having cupped hubs loose on said shaft between the last-named bearings and said heads and adapted to engage the latter, said shaft being tubular and having radial lubricating passages within said bearings and sleeves and its extremities threaded, a nut on each extremity against the last-named bearing, a cap on said extremity serving as a lock nut and pierced with a hole communicating with the bore of the shaft, and a screw for removably closing said hole.

3. In a tractor, the combination with a rigid frame having bearings, sleeves mounted therein and having heads at their outer ends, a prime mover, and manually controlled connections between it and said sleeves; of an outer frame comprising side bars having bearings alined with those of the main frame, a shaft passing through said sleeves and extending through and journaled in the bearings of the outer frame, sprocket wheels having cupped hubs loose on said shaft between the last-named bearings and said heads and adapted to engage the latter, a shaft journaled in bearings at the other end of the main frame and side bars, sprocket wheels carried by this shaft in line with those first mentioned, endless articulated tracks connecting each pair of sprocket wheels, upright guideways carried by said side bars, and spring-pressed rollers mounted in said guideways and bearing on the lower run of the tracks and upward beneath the upper run thereof.

4. In a tractor, the combination with a frame having bearings, sleeves mounted therein, a prime mover, and manually controlled connections between it and said sleeves; of a shaft passing through said sleeves, sprocket wheels having hubs loose on said shaft and adapted to engage the sleeves, a shaft journaled in bearings at the other end of the frame, sprocket wheels carried by this shaft in line with those first mentioned, endless articulated tracks connecting each pair of sprocket wheels, upright guideways carried by said frame, and spring-pressed rollers mounted in said guideways and bearing on the lower run of the tracks and upward beneath the upper run thereof.

5. In a tractor, the combination with a frame having bearings near its front and rear at each side, the main shafts journaled therein, sprockets thereon, and two endless articulated tracks connecting the front and rear sprockets; of upright guideways carried by said frame, bearing blocks slidably mounted in the guideways, rollers journaled in said blocks, and spring pressing the upper blocks toward the upper run of the tracks and the lower blocks toward the other run thereof.

6. In a tractor, the combination with the main frame having bearings near its front and rear at each side, the main shafts journaled therein, sprockets thereon, two endless articulated tracks connecting the front and rear sprockets, outer frame sections alongside the main frame, and outer frame members above said sections and connected with them and with the main frame; of upstanding guideways rising from said frame members, other guideways depending therefrom and connected with said frame sections, bearing blocks movably mounted in all of said guideways and carrying idlers, and springs acting on the blocks and pressing the idlers into contact with the upper and lower run of the tracks.

In testimony whereof I affix my signature in presence of two witnesses.

JUAN G. CASTERAN.

Witnesses:
 GEORGE L. THORN,
 HUGO MOCK.